US008150588B2

(12) United States Patent
Klooster

(10) Patent No.: US 8,150,588 B2
(45) Date of Patent: Apr. 3, 2012

(54) METHODS AND SYSTEM FOR TIME OF ARRIVAL CONTROL USING TIME OF ARRIVAL UNCERTAINTY

(75) Inventor: Joel Kenneth Klooster, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 697 days.

(21) Appl. No.: 12/277,868

(22) Filed: Nov. 25, 2008

(65) Prior Publication Data

US 2010/0131124 A1 May 27, 2010

(51) Int. Cl.
*G05D 1/00* (2006.01)
*B64C 13/00* (2006.01)
*G06F 19/00* (2006.01)

(52) U.S. Cl. ................. 701/66; 701/3; 701/70; 370/335

(58) Field of Classification Search .................... 701/66, 701/3, 70; 370/335
See application file for complete search history.

(56) References Cited

U.S. PATENT DOCUMENTS 4,774,670 A 9/1988 Palmieri
5,121,325 A 6/1992 DeJonge
5,845,227 A 12/1998 Peterson
7,272,491 B1 9/2007 Berard
7,283,895 B2 * 10/2007 Bouchet ............................ 701/3
7,437,225 B1 10/2008 Rathinam
2005/0216140 A1 9/2005 Bouchet
2007/0100538 A1 5/2007 Wise et al.
2008/0228333 A1 * 9/2008 De Menorval et al. ......... 701/14
2008/0243314 A1 10/2008 Ridenour

FOREIGN PATENT DOCUMENTS

EP 1564527 A1 8/2005
FR 2913780 A1 9/2008
WO 02093281 A1 11/2002

OTHER PUBLICATIONS

PCT/US2009/059921, Search Report and Written Opinion, Jun. 23, 2010.

* cited by examiner

*Primary Examiner* — Tan Q Nguyen
(74) *Attorney, Agent, or Firm* — David J. Clement, Esq.; Armstrong Teasdale LLP

(57) ABSTRACT

Methods and a system for vehicle control are provided. The system includes an input device configured to receive a required time of arrival at a waypoint and a processor communicatively coupled to the input device. The processor is programmed to determine a forward late time profile, determine a forward early time profile representing the earliest time the vehicle could arrive at a point along the track and still arrive at the waypoint while transiting at a maximum available speed, and determine an estimated time uncertainty (ETU) associated with at least one of the forward late time profile and the forward early time profile. The system also includes an output device communicatively coupled to the processor, the output device configured to transmit the determined uncertainty with a respective one of the at least one of the forward late time profile and the forward early time profile to a display.

20 Claims, 9 Drawing Sheets

METHODS AND SYSTEM FOR TIME OF ARRIVAL CONTROL USING TIME OF ARRIVAL UNCERTAINTY

BACKGROUND OF THE INVENTION

This invention relates generally to controlling a speed of a vehicle and, more particularly, to methods and a system for time of arrival control of a vehicle using time of arrival uncertainty.

At least some known aircraft are controlled in three dimensions: latitude, longitude, and altitude. There has been extensive operational experience in three dimensions as evidenced by advances made in Required Navigation Performance (RNP). The computation of the uncertainty associated with navigation performance for flight crews has been developed to enable monitoring of the Actual Navigation Performance (ANP) to ensure compliance with applicable RNP. More recently, the ability to control aircraft in the fourth dimension, time, has been shown to enable advanced airspace management resulting in increased capacity. The use of time-based arrival management facilitates earlier landing time assignments and more efficient use of the runway. This also results in economic benefits if each aircraft can determine its desired landing time using its mast fuel optimum flight profile. In addition to the Required Time-of-Arrival (RTA), an estimated Earliest and Latest Time-of-Arrival is also computed using the maximum and minimum operating speeds, respectively. However, there may be uncertainties and errors associated with the data and methods used to compute these arrival times. There is currently no method to accurately compute, transmit to other systems for further processing, and display the uncertainty associated with any time computation or time control mechanism, given the uncertainties associated with the data used to compute the time of arrival.

BRIEF DESCRIPTION OF THE INVENTION

In one embodiment, a vehicle control system includes an input device configured to receive a required time of arrival at a waypoint and a processor communicatively coupled to the input device. The processor is programmed to determine a forward late time profile representing the latest time the vehicle could arrive at a point along the track while transiting at a minimum available speed, determine a forward early time profile representing the earliest time the vehicle could arrive at a point along the track and still arrive at the waypoint while transiting at a maximum available speed, and determine an estimated time uncertainty (ETU) associated with at least one of the forward late time profile, forward early time profile and a reference time profile. The system also includes an output device communicatively coupled to the processor, the output device configured to transmit the determined uncertainty with a respective one of the at least one of the forward late time profile, forward early time profile and the reference time profile to at least one of another system for further processing and a display.

In another embodiment, a method of controlling a speed of a vehicle along a track includes receiving a required time of arrival (RTA) at a predetermined waypoint, determining a forward late time profile representing the latest time the vehicle could arrive at a point along the track and still arrive at the predetermine waypoint at the RTA while transiting at a maximum available speed and determining a forward early time profile representing the earliest time the vehicle could arrive at a point along the track and still arrive at the predetermine waypoint at the RTA while transiting at a minimum available speed. The method also includes determining an estimated time uncertainty (ETU) associated with at least one of the forward late time profile and the forward early time profile, and outputting the determined uncertainty with a respective one of the at least one of the forward late time profile and the forward early time profile.

In yet another embodiment, a method of controlling a speed of a vehicle includes receiving a required time of arrival of the vehicle at a waypoint, determining a forward late time profile representing the latest time the vehicle could arrive at a point along the track and still arrive at the predetermined waypoint while transiting at a maximum available speed, and determining a forward early time profile representing the earliest time the vehicle could arrive at a point along the track and still arrive at the predetermined waypoint while transiting at a minimum available speed. The method also includes determining a backward early time profile using a maximum speed profile backward from the RTA time wherein the maximum speed profile is determined for the vehicle while transiting at a maximum available speed, determining a backward late time profile using a minimum speed profile backward from the RTA time, wherein the minimum speed profile is determined for the vehicle while transiting at a minimum available speed, determining an estimated time uncertainty (ETU) associated with at least one of the forward late time profile, the forward early time profile, the backward early time profile and the backward late time profile, and controlling a speed of the vehicle using at least one of the forward late time profile, the forward early time profile, the backward early time profile the backward late time profile, and a respective determined uncertainty.

BRIEF DESCRIPTION OF THE DRAWINGS

FIG. 1 is a graph of earliest, reference, and latest time profiles in accordance with an exemplary embodiment of the present invention;

FIG. 2 is a graph of an exemplary reference time profile that includes an uncertainty associated with the parameters that are used to determine reference time profile 200;

FIG. 3 is a graph of forward and backward computed profiles and associated uncertainties in accordance with an exemplary embodiment of the present invention;

FIG. 4 is a graph of a representation of elapsed times and time uncertainties along a profile in accordance with an exemplary embodiment of the present invention;

FIG. 5 is a graph illustrating the increasing uncertainty between wind entries in accordance with an exemplary embodiment of the present invention;

FIG. 6 is a graph of scaled RTA control boundaries in accordance with an exemplary embodiment of the present invention;

FIG. 7 is a graph illustrating when speed up control ends at a speed limit altitude prior to a loss of slow down control;

FIG. 8 is graph illustrating an RTA achievable with 95% probability in accordance with an exemplary embodiment of the present invention; and FIG. 9 is a schematic block diagram of a vehicle control system in accordance with an exemplary embodiment of the present invention.

DETAILED DESCRIPTION OF THE INVENTION

The following detailed description illustrates embodiments of the invention by way of example and not by way of limitation. It is contemplated that the invention has general application to methods of the quantification of a level of probability of achieving a compute time-of-arrival that provides both the aircrew and the air traffic controller a quantifiable level of certainty associated with a predicted ETA. This uncertainty can be displayed in the cockpit and downlinked to the air-traffic controller. Such additional information can be used to determine the necessary spacing between aircraft, which can allow an aircraft to fly a more fuel-efficient profile without adverse controller intervention. The computation of the first and last allowable time-of-arrival also provides information not previously available to aid in metering aircraft while still allowing an aircraft to meet its required time-of-arrival at a downstream point. The computed estimated time uncertainty (ETU) is displayed to the pilot on the Primary Flight Display (PFD), a Navigation Display (ND), a Control and Display Unit (CDU), or a combination thereof.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
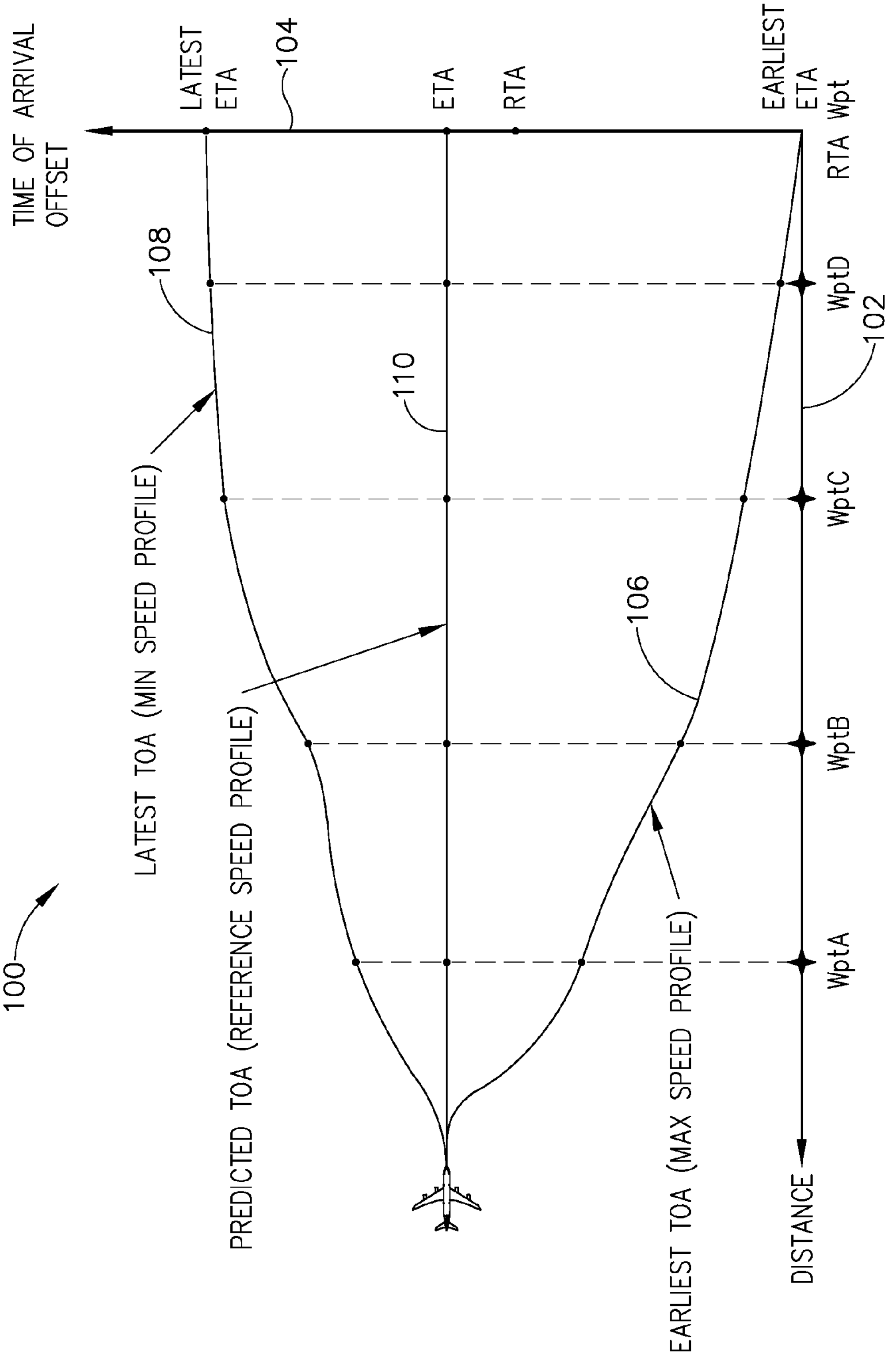
FIGS. 1-9 show exemplary embodiments of the methods and system described herein.

FIG. 1 is a graph 100 of earliest, reference, and latest time profiles in accordance with an exemplary embodiment of the present invention. Graph 100 includes an x-axis 102 graduated in units of distance and a y-axis 104 graduated in units of time representing a time of arrival offset from a determined estimated time of arrival (ETA). Certain parameters associated with required time of arrival (RTA) operation are used herein as described below. An RTA waypoint may be crew entered or uplinked from another onboard or offboard system and is used to describe a waypoint where a required crossing time is specified. An RTA time may be crew entered or uplinked from another onboard or offboard system and is used to describe a required crossing time expressed in hours: minutes:seconds GMT. An RTA tolerance may be crew entered or uplinked from another onboard or offboard system and is used to describe an allowable plus and minus crossing time tolerance that is considered to be on-time expressed in seconds. A current ETA, in the exemplary embodiment, is a computed value that describes an estimated time of arrival at the RTA waypoint. A first time is also a computed value and describes an earliest possible time of arrival using the fastest allowable speed within aircraft limits. A last time is also a computer value in the exemplary embodiment and describes a latest possible time of arrival using the slowest allowable speed within aircraft limits. An Estimated Time Uncertainty (ETU) is a computed value and describes two times the standard deviation of ETA estimation error (95% confidence level). A Current Time Uncertainty (CTU) is a computed value and describes two times the standard deviation of current time measurement error (95% confidence level). A distance to RTA waypoint is a computed value and describes an along track distance to go to the RTA waypoint. An RTA Error is a computed value and describes a difference between the RTA time and the Current ETA expressed as EARLY or LATE time in hours, minutes and seconds when the difference is outside the RTA tolerance. In some systems the above parameters may be displayed on a multi-function control display unit (MCDU).

During operation, after a user enters an RTA waypoint into a speed management system, the user is prompted for an RTA time equal to the predicted ETA using a cost-optimal flight profile. The RTA time is the desired time of arrival using minimum cost profile for flight. The user can change the prompted value by entering a new value that may be assigned by air traffic control. The resulting RTA speed target is provided as the active speed command to the autopilot and displayed on a primary flight display. The target speed may be overridden by any applicable speed restriction. The restricted speed is taken into account when computing the estimated time of arrival (ETA). By following the active speed command, the aircraft should achieve the RTA if it is within the aircraft speed limits to do so. However, the information currently computed and presented contains no indication of how likely it is that this RTA will actually be achieved given uncertainties in the information used to compute any of the ETAs. In addition, the first and last possible time-of-arrival is only computed and displayed for the active RTA waypoint; there is no indication of what possible crossing times can be achieved for intermediate points, or at what point a speed adjustment may be made to control to the entered RTA.

A time uncertainty algorithm in accordance with an exemplary embodiment of the present invention generates an earliest achievable speed profile 106 for a maximum speed and a latest achievable speed profile 108 for a minimum speed as well as a predicted reference speed profile 110. The profiles provide the earliest achievable, latest achievable, and predicted times-of-arrival at each waypoint as well as the reference ETA at the RTA waypoint and at each intermediate waypoint between the aircraft and the RTA waypoint. In addition, an uncertainty for each time profile is computed.

Figure 2:
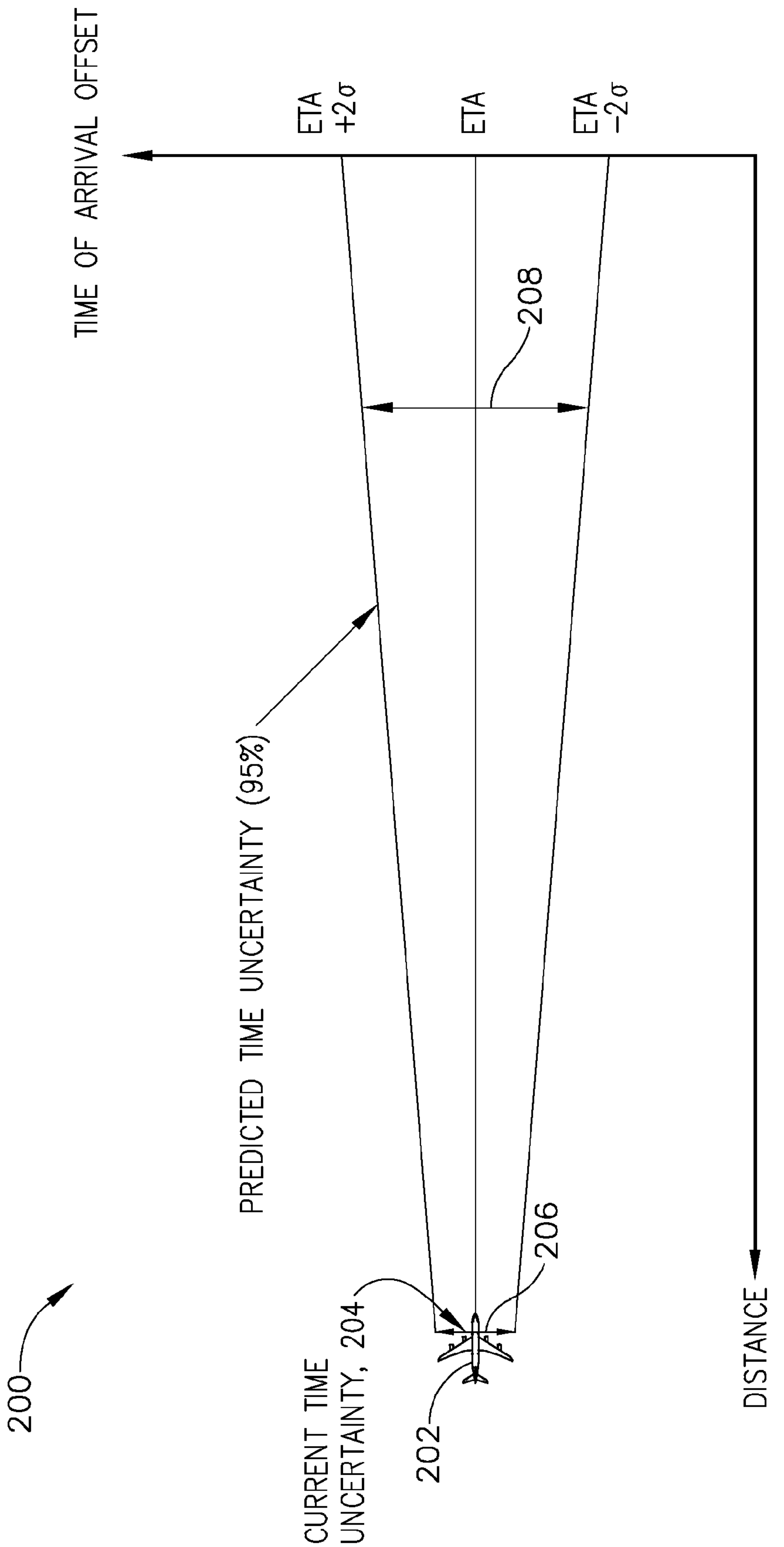

FIG. 2 is a graph of an exemplary reference time profile 200 that includes an uncertainty associated with the parameters that are used to determine reference time profile 200. The uncertainty includes an uncertainty in the current time, as well as an uncertainty in the predicted ETAs at points ahead of the aircraft. This uncertainty in the predicted ETAs is cumulative, and thus grows larger the farther ahead of the current time it is. This growing ETA uncertainty is illustrated as a diverging offset about the predicted ETA. At aircraft 202 a current uncertainty 204 is very small, a future time uncertainty 208 is larger due to the cumulative effect of the uncertainties determined. In the exemplary embodiment, the uncertainty is characterized as a 2$\sigma$ (two standard deviations, or 95% certainty) value. However, if the standard deviation ($\sigma$) or variance ($\sigma^2$) of the ETA is computed, the uncertainty can be characterized in other degrees of confidence as desired.

Figure 3:
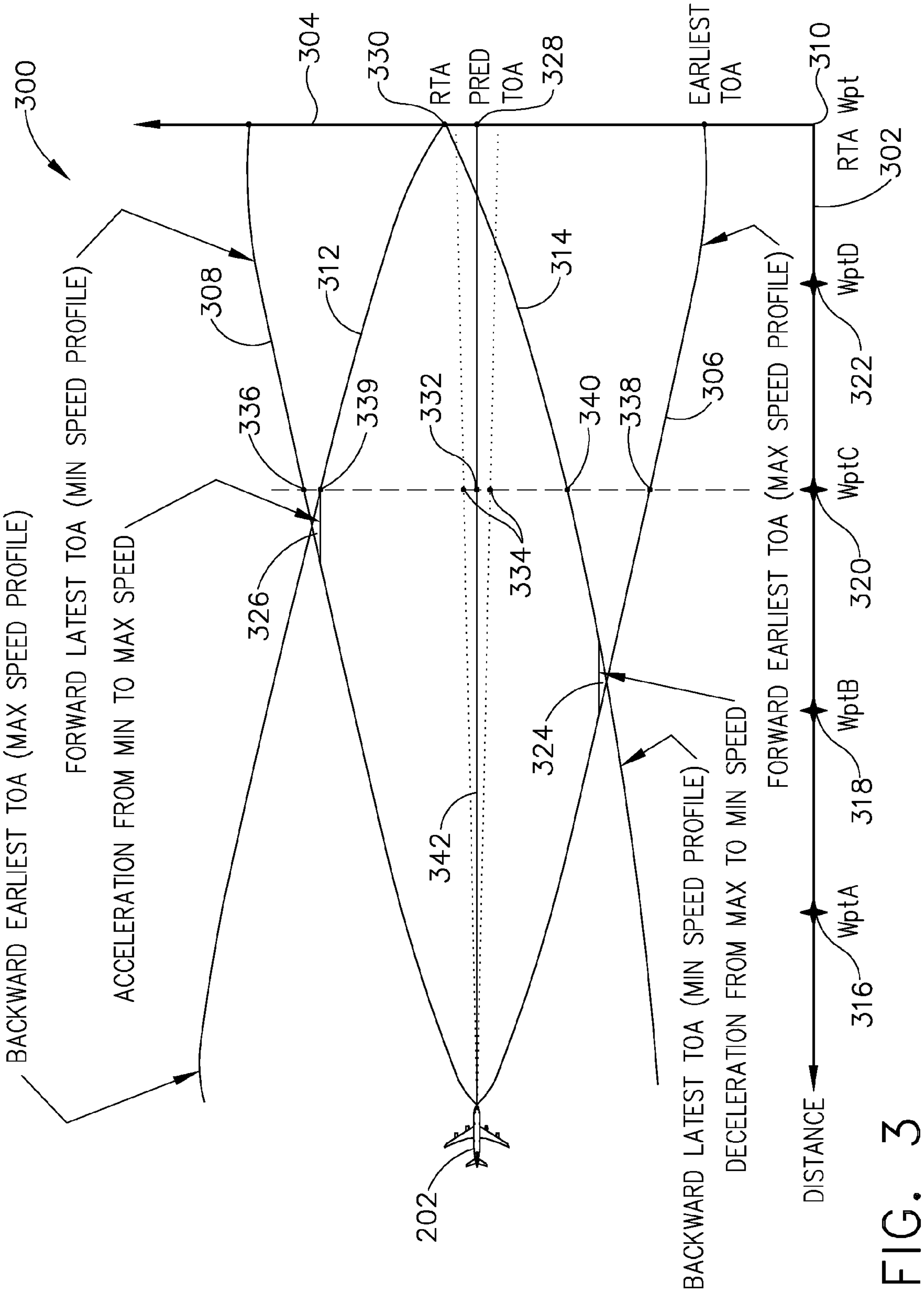

FIG. 3 is a graph 300 of forward and backward computed profiles and associated uncertainties in accordance with an exemplary embodiment of the present invention. Graph 300 includes an x-axis 302 graduated in units of distance and a y-axis 304 graduated in units of time representing a time of arrival offset from a determined estimated time of arrival (ETA).

When an earliest achievable time profile 306 and a latest achievable time profile 308 and associated uncertainties have been determined forward from aircraft 202 to an RTA waypoint 310, a backward earliest achievable time profile 312 and a backward latest achievable time profile 314 are also able to be determined backward from RTA waypoint 310 using stored ETAs and delta times for the profiles. With the profiles computed forward and backward, the minimum and maximum allowable crossing times at each intermediate waypoint, for example, a waypoint A 316, a waypoint B 318, a waypoint C 320, and a waypoint D 322 can be computed representing the earliest and latest times that the aircraft could pass each respective waypoint and still meet the RTA time at the RTA waypoint. Because the times represent flying a combination of maximum and minimum speeds, a deceleration 324 and acceleration 326 between the speeds is also determined. In some cases a current predicted time of arrival (TOA) 328 at RTA waypoint 310 may not exactly equal an entered RTA time 330. However, this is acceptable if the error (ETA-RTA) is within a specified tolerance.

When the reference, earliest forward, earliest backward, latest forward, and latest backward time profiles have been determined, along with the ETA uncertainty, other data described below is determinable for each point as illustrated for waypoint C 320.

(1) Reference ETA 332—Estimated Time-of-Arrival at the point (2) Reference ETA Uncertainty 334—value (in seconds) around reference ETA 332 within which the aircraft will arrive at the point with 95% certainty, assuming no flight technical error.

(3) Latest Achievable Time 336—the Latest Time-of-Arrival that can be achieved at the point, assuming the minimum speed profile is followed immediately. This does not take into account any downstream RTA.

(4) Earliest Achievable Time 338—the Earliest Time-of-Arrival that can be achieved at the point, assuming the maximum speed profile is followed immediately. This does not take into account any downstream RTA.

(5) Latest Allowable Time 339—the latest Time-of-Arrival that can be allowed at the point if the RTA constraint is to be honored. This represents initially flying at the minimum speed, then accelerating to and flying the maximum speed up to the RTA waypoint.

(6) Earliest Allowable Time 340—the earliest Time-of-Arrival that can be allowed at the point if the RTA constraint is to be honored. This represents initially flying at the maximum speed, then decelerating to and flying the minimum speed up to the RTA waypoint.

Using this data, the RTA Achievable or RTA Unachievable status can be determined with a quantifiable degree of certainty, using an Estimated Time Uncertainty (ETU). This ETU represents the variance around the ETA that the aircraft can be expected to cross the RTA waypoint with 95% certainty. In other words, there is a 95% probability that the aircraft will cross the RTA waypoint at the ETA±the ETU (in seconds). Moreover, the ETU may be computed for each of the time profiles shown. Thus, the Earliest/Latest Achievable Times and Earliest/Latest Allowable Times may each be expressed with a quantifiable certainty as well.

A reference time profile 342 is determined using the reference speed profile (needed to meet the RTA) forward from current time. Forward early time profile 306 is determined using the maximum speed profile (within speed envelope) forward from the current time. Forward late time profile 308 is determined using the minimum speed profile (within speed envelope) forward from the current time. Backward early time profile 312 is determined using the maximum speed profile backward from the RTA time, and backward late time profile 314 is determined using the minimum speed profile backward from the RTA time.

Figure 4:
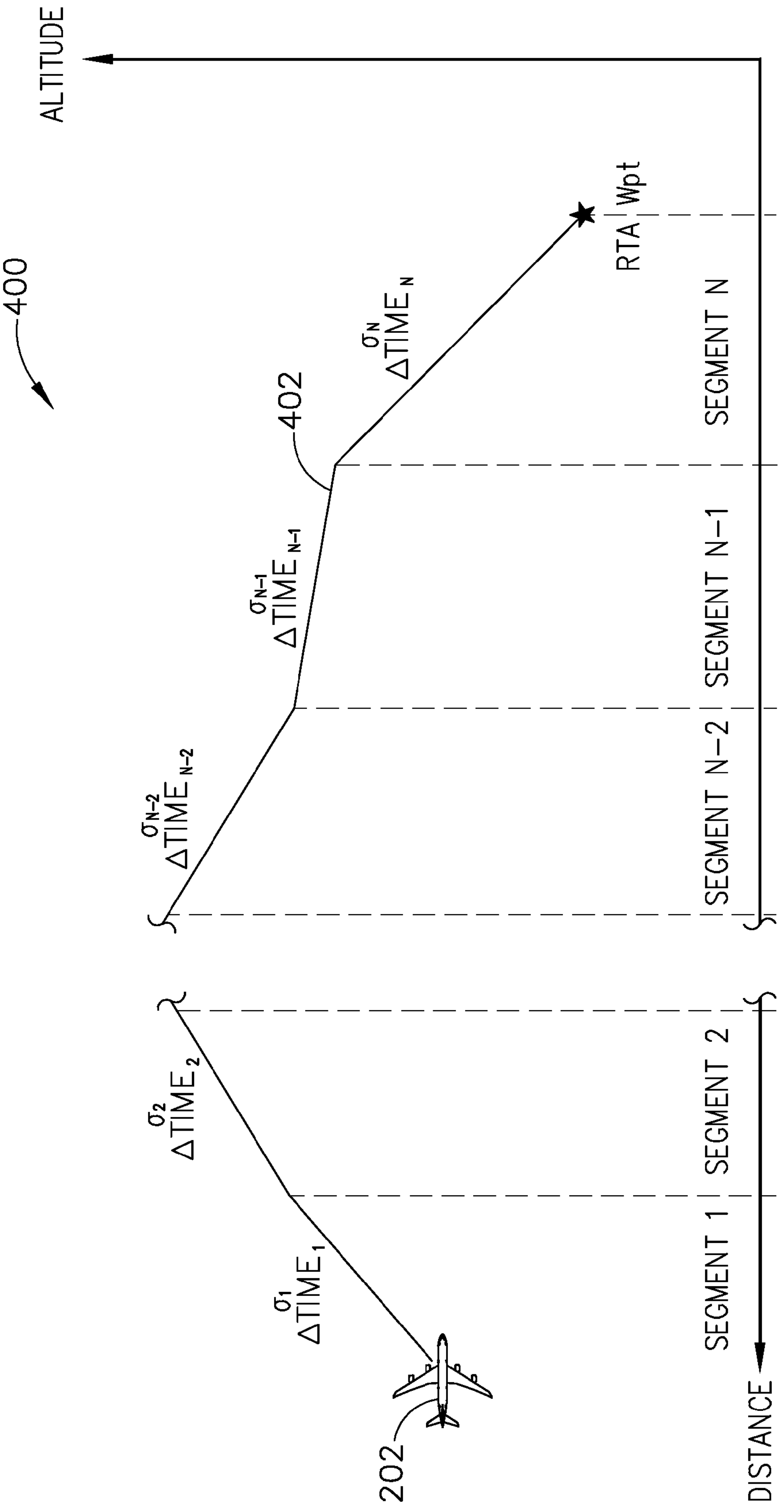

FIG. 4 is a graph 400 of a representation of elapsed times and time uncertainties along a profile in accordance with an exemplary embodiment of the present invention. Reference time profile 342, forward early time profile 306, and forward late time profile 308 can be determined forward from aircraft 202 starting at the current time by integrating equations of motion over a predicted trajectory of aircraft 202 for the three different speed profiles. This trajectory includes a sequence of $N_{profile}$ trajectory segments, and each trajectory segment has an associated elapsed time from the previous trajectory segment end point ($\Delta Time_j$), and uncertainty associated with the ETA computation for that segment ($\sigma_j$) for j in 1 . . . $N_{profile}$. The uncertainty may be computed independently for each time profile. However, if processing efficiency is needed, the uncertainty in the earliest and latest time profiles may be assumed to be equal to the uncertainty in the reference time profile. There is also uncertainty in the current measured time relative to the assumed aircraft position ($\sigma_{current}$) which is based on both the time input as well as the Estimated Position Uncertainty (EPU) translated to lateral time uncertainty using the aircraft ground speed.

The uncertainty associated with each time profile is computed such that the predicted time along the profile will be met within±the Estimated Time Uncertainty (ETU) value with some probability, for example, 95% probability, corresponding to 2σ. If processing efficiency is needed, it may be assumed that the ETU associated with the earliest and latest times is equal to the ETU associated with the reference time. The dominate error sources that contribute to ETU are wind and temperature uncertainty, and position uncertainty. The current time measurement uncertainty and errors in the computation and integration of the lateral and vertical path will also contribute to the ETU and is dependant on the time source used as the input to the system, the trajectory prediction algorithms used, and the method of controlling to the speeds commanded by the system.

To compute the ETU, the variance of all parameters used to compute the time must be known, where the time along the segments with a constant ground speed is computed as:

$$\text{Time} = \frac{Dist}{GroundSpeed} \tag{1}$$

$$GroundSpeed = \left|\vec{TAS} + \vec{Wind}\right| \tag{2}$$

$$TAS = \frac{A_0}{\sqrt{T_0}} * \text{Mach} * \sqrt{\text{Temp}} \tag{3}$$

Where: TAS=True Air Speed $A_0$=Speed of sound at standard sea level (661.4788 knots)

$T_0$=Standard sea level temperature (288.15° K.)

Temp=temperature in ° Kelvin

Therefore, the variance of distance, wind, temperature, and Mach are needed. There is also a variance in time that results from the integration of the equations of motion (for example, assuming a constant ground speed over some finite interval). Finally, there will also be a variance in the current time measurement, which is a function of both the position uncertainty translated to time, and the input time uncertainty. The variance associated with each of these parameters is discussed below.

Figure 5:
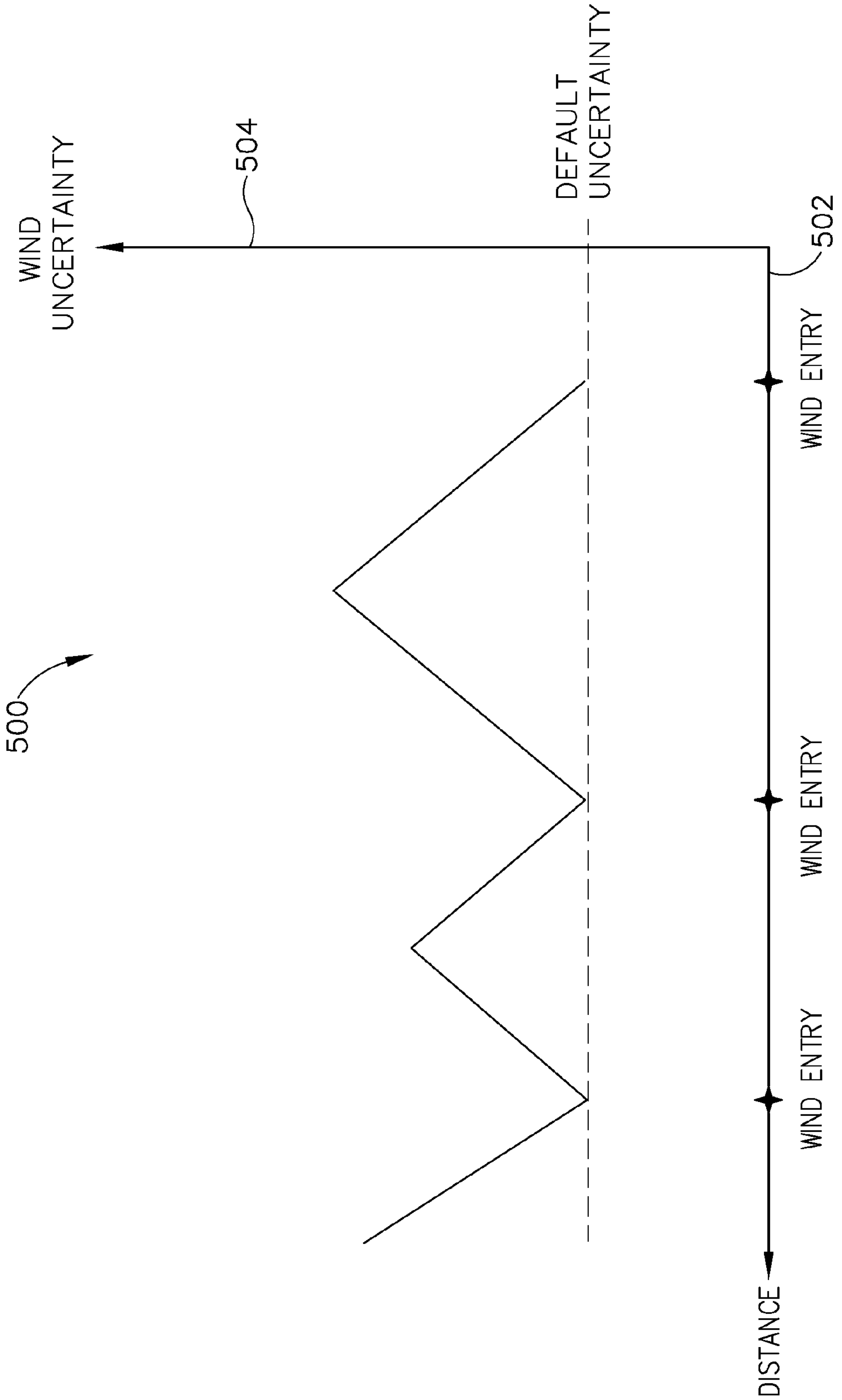

FIG. 5 is a graph 500 illustrating the increasing uncertainty between wind entries in accordance with an exemplary embodiment of the present invention. Graph 500 includes an x-axis 302 graduated in units of distance, which may be correlated to time when the speed of the vehicle is considered. Graph 500 also includes a y-axis 504 graduated in units of uncertainty.

1. Wind

The uncertainty associated with the forecast tailwind over a segment will contribute directly to uncertainty in time over that segment. Therefore, the uncertainty in time resulting from uncertainty in tailwind may be defined as:

$$\text{Var1} = \left(\frac{\text{Time}}{GroundSpeed}\right)^2 * WindVariance \quad (4)$$

The value of the wind variance used in this computation depends on the source and number of wind forecasts that are used by the trajectory prediction. This represents the variance of the wind along the flight track, and is determined from the uncertainty in the wind magnitude as well as the wind direction. Three general situations exist:

1. No winds entered or only one cruise wind: In this case, there will be a very large uncertainty associated with the wind forecast used by the system.

2. Pilot entered climb and descent winds and winds entered at cruise waypoints: 'This will result in a smaller value of uncertainty than in case 1. There will be one value of uncertainty associated with the wind at the point for which it is defined (either a waypoint or descent altitude). However, the uncertainty will be larger between the points for which the wind is defined, as shown in FIG. 5. A larger number of wind entries may result in a smaller effect on the uncertainty. The magnitude of the uncertainty may also be increasing with time. Generally, the uncertainty will be smallest immediately after entry, and will grow thereafter.

3. Data-linked climb and descent winds, and winds entered at cruise waypoints. If the winds are sent via data-link, an uncertainty value associated with each wind may be sent as well. The combination of this uncertainty value and the possibility to enter many more winds via data-link will result in a much smaller uncertainty than in case 2. The increasing uncertainty between wind entries and over time applies in this case as well.

2. Temperature

The uncertainty associated with the forecast temperature over a segment acts less directly on the time uncertainty. For a function f(X) of an independent variable X for which derivatives of the function exist up to a certain order greater than two, the function f(X) may be approximated using a second-order Taylor series. In this case, the variance of f(X) due to a known variance in X may be approximated by:

$$\text{Var}(f(X)) = \left[\frac{\delta}{\delta X} f(E(X))\right]^2 \text{Var}(X) \quad (5)$$

Where E(X) is the expected value of X.

Because TAS is a function of both the Mach and the ambient temperature as defined in equation (3), f may be replaced by TAS and X replaced by Temperature in equation (5), so the variance in TAS resulting from variance in temperature may be defined as:

$$\text{TAS\_Variance(Temp)} = \left[\frac{\frac{A_0}{\sqrt{T_0}} * \text{Mach}}{2\sqrt{\text{Temp}}}\right]^2 * TempVariance \quad (6)$$

and the time variance due to a known temperature variance is:

$$\text{Var2} = \left(\frac{\text{Time}}{GroundSpeed}\right)^2 * \text{TAS\_Variance(Temp)} \quad (7)$$

The value of the temperature uncertainty used in this computation depends on the source and number of temperature forecasts that are input to the system. The three general situations described for the wind uncertainty apply to the temperature uncertainty as well.

3. Mach

The computed Mach value has a variance that may be computed from the variance of the parameters used to compute the Mach. Because the Mach is computed differently for each system, the relationship between the variance of the computed Mach value and the variance of the input parameters will be different for each system. If there are N parameters used to compute the Mach, the variance of the computed value of the mach is:

$$\text{Computed\_Mach\_Var} = \sum_{i=1}^{N} \sum_{j=1}^{N} \text{Cov}(Xi, Xj) \quad (8)$$

Where Cov(Xi,Xj) is the co-variance between parameter Xi and Xj. If i=j, (Cov(Xi,Xj) is the variance of parameter Xi. If parameters Xi and Xj are independent, Cov(Xi,Xj)=0.

In addition to the variance of the computed Mach value, there is also an uncertainty associated with the measured Mach value that will be tracked by the flight control system. Because this measured Mach uncertainty is independent of the computed Mach value, the total Mach variance is the sum of the variances.

Mach_Var=Computed_Mach_Variance+Measured-_Mach_Var (9)

the resulting TAS variance is $$\text{TAS\_Variance(Mach)} = \left[\frac{A_0}{\sqrt{T_0}} * \sqrt{\text{Temp}}\right]^2 * \text{Mach\_Var} \quad (10)$$

and the time variance is $$\text{Var3} = \left(\frac{\text{Time}}{GroundSpeed}\right)^2 * \text{TAS\_Variance(Mach)} \quad (11)$$

4. Distance

The uncertainty in the actual distance that will be flown contributes to the uncertainty in time. Sources of error that contribute to this uncertainty include the use of a flat or spherical earth model instead of a WG884 geodesic and modeling of instantaneous throttle changes instead of the transient spool-up and spool-down effects.

It should be noted that some of the error sources contributing the 3D path uncertainty are correlated, making it very difficult and computationally complex to compute a closed form expression for this uncertainty in real-time. However, off-line analysis can be performed to compare the system generated path to the actual 3D path of the aircraft (using either recorded flight data or an accepted truth model), and the mean and standard deviation of the error can be computed. Assuming a sufficiently large sample of error data is used, this standard deviation can be used to compute the distance variance (where var=$\sigma^2$). It should be noted that this stochastic modeling has already been performed for lateral and vertical RNP analysis, and the distance variance can be converted to a time variance as:

$$\text{Var4} = \left(\frac{1}{GroundSpeed}\right)^2 * \text{Dist\_Variance} \quad (12)$$

5. Integration Method

The uncertainty associated with the method of integrating the equations of motion contributes to an uncertainty in time as well. The impact on time comes primarily from assuming instantaneous throttle changes, and assuming a constant ground speed over finite intervals. Off-line tools have been used previously to compute the standard deviation of the time errors, and this standard deviation can be converted to a variance as:

$$\text{Var5} = (\sigma_{integration})^2 \quad (13)$$

6. Position

The Estimated Position Uncertainty (EPU) results in an uncertainty in time along track. Assuming that the EPU will be constant throughout the flight, the current value of the EPU (in feet) and ground speed on a segment can be used to compute the variance in time due to position uncertainty along the track. Given the position uncertainty in the along track dimension (which can be computed given a radial position uncertainty), the current along track uncertainty is:

$$\text{Var6} = \left[\frac{\text{standard deviation in along-track position error}}{Groundspeed}\right]^2 \quad (14)$$

7. Input

There is an uncertainty associated with the input time. This is a constant value, Var7, and depends on the source of the input time. The use of GPS time will result in a very small uncertainty. However, if GPS time is not used the uncertainty may be quite significant.

Estimated Time Uncertainty

The variances Var1 to Var6 described above may be computed independently for each integration segment. The input variance Var7 will typically be relatively constant. Assuming that all uncertainties have a Gaussian distribution, the variances for parameters 1 to 5 from a point at the beginning of segment A to a point at the end of segment B may be computed as the sum of the variances for all segments between A and B as:

$$\text{Var}X(A, B) = \sum_{i=A}^{B} \text{Var}X(i) \quad (15)$$

Where VarX(i) is the variance of parameter X on segment i

VarX(A,B) is the variance of parameter X between point A and point B

X=1 . . . 5

The position and input variances, Var6 and Var7, are not cumulative and apply only at a given point. As mentioned previously, the position variance is computed for the ground speed at a given point, while the input variance is constant. Thus, $$\text{Var6}(A,B) = \text{Var6}(B) \quad (16)$$

$$\text{Var7}(A,B,) = \text{Var7} \quad (17)$$

Given these variances between point A, for example, the vehicle position and point B, for example, the RTA waypoint position, as well as the covariance between parameters i and j (cov(Xi,Xj)), the time variance can then be computed independently for each time profile between points A and B as:

$$\text{Time\_Variance}(A, B) = \sum_{i=1}^{N}\sum_{j=1}^{N} \text{Cov}(Xi, Xj, A, B) \quad (18)$$

Where, cov(Xi,Xj,A,B) is the covariance between parameters Xi and Xj, and cov(Xi,Xj,A,B)=VarI(A,B) for I=J N=the number of parameters whose variance is known and used If any parameters are uncorrelated, then $$\text{cov}(Xi,Xj,A,B) = \text{cov}(Xj,Xi,A,B) = 0$$

Because the variance is the square of the standard deviation (σ), the 95%, or 2σ, ETU between points A and B is:

$$\text{ETU}_{2\sigma}(A,B) = 2\sqrt{\text{Time\_Variance}(A,B)} \quad (19)$$

This ETU may be computed for all time profiles independently. For processing efficiency it may also be assumed that the ETU is equal for all time profiles, and thus computed only for the reference time profile. Also, it should be noted that if all parameters are uncorrelated, then $$\text{Cov}(Xi,Xj,A,B) = 0 \text{ for all } i \neq j$$

$$\text{Var}(Xi,Xj,A,B) = [\sigma_i(A,B)]^2$$

And the ETU reduces to the well known Root-Sum-Squares (RSS) method:

$$\text{ETU}_{2\sigma}(A,B) = 2*\sqrt{\Sigma[\sigma_i(A,B)]^2} \quad (20)$$

The five time profiles shown in FIG. 3 can also be computed. The Early and Late backwards time profiles represent the same trajectories as in the forward direction, with the exception that the starting time represents the time needed to exactly meet the RTA at the RTA waypoint. Thus, the ΔTimes and ETUs for the backward time profiles are the same as the respective forward profiles, and the ETA can be computed by simply setting the ETA at the RTA waypoint equal to the RTA time, and subtracting the ΔTimes for all previous trajectory segments. The details of these time profile computations are shown below:

$$\text{Reference } ETA_j = CurrentTime + \sum_{i=1}^{j} \Delta\text{Time}(ref)i \quad (21)$$

$$\text{Forward Earliest Achievable } Time_j = CurrentTime + \sum_{i=1}^{j} \Delta\text{Time}(\text{early})i \quad (22)$$

$$\text{Forward Latest Achievable } Time_j = CurrentTime + \sum_{i=1}^{j} \Delta\text{Time}(\text{late})i \quad (23)$$

$$\text{Backward Earliest Achievable } Time_j = RTA_t + \sum_{i=N}^{j} \Delta\text{Time}(\text{early})i \quad (24)$$

$$\text{Backward Latest Achievable } Time_j = RTA_j - \sum_{i=N}^{j} \Delta\text{Time}(\text{late})i \quad (25)$$

The forward earliest and backward latest time profiles will intersect at some point between the aircraft position and the RTA waypoint, representing the switch from maximum speed to minimum speed. The deceleration from the maximum to minimum speed may then be computed. This can then be used to compute the Earliest Allowable Time, which is defined as moving forward from the aircraft to the RTA waypoint:

the forward earliest achievable time profile prior to the start of the deceleration the deceleration time profile between the start and end of the deceleration the backward latest achievable time after the end of the deceleration The Latest Allowable Time is defined in the same manner using the forward latest achievable time profile, the backwards earliest achievable time profile, and the acceleration from minimum speed to maximum speed.

Figure 6:
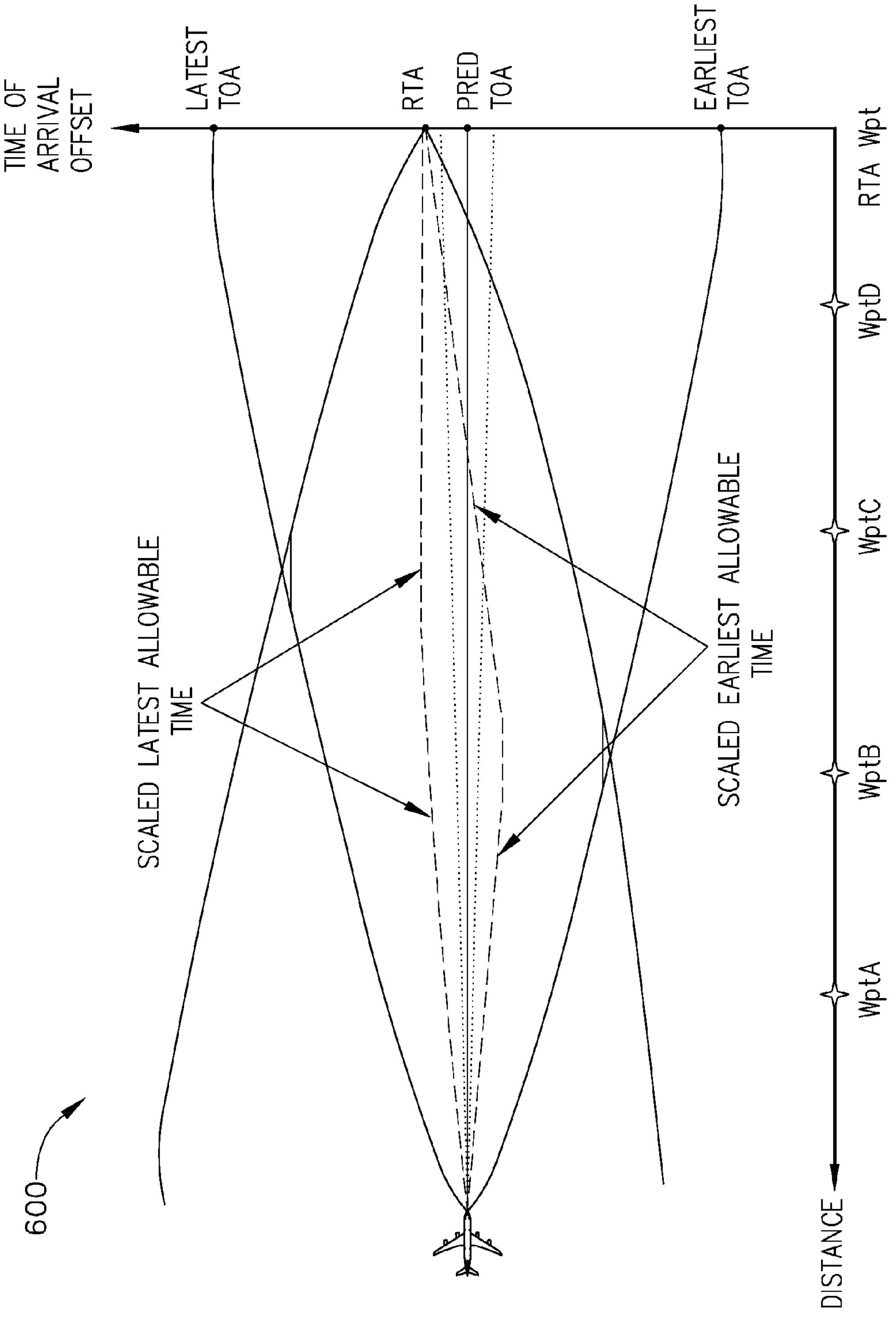

FIG. 6 is a graph 600 of scaled RTA control boundaries in accordance with an exemplary embodiment of the present invention. The Earliest and Latest Allowable Times gives a-priori knowledge of the maximum and minimum times that will be allowed before a speed adjustment is made to meet a new time-of-arrival. However, it is not efficient nor flexible to allow the speed control to alternate fully between the minimum speed and the maximum speed. Therefore, these Earliest and Latest Allowable times may be scaled by a damping factor γ as shown in FIG. 6. γ is chosen to prevent large speed changes while balancing the frequency of these required speed changes. The computed ETU may be used to determine an appropriate γ (which may or may not be time-varying), or a constant value based on off-line data analysis may be chosen. The value of γ that is used should be coordinated with the time-control mechanism implemented.

The knowledge of the Earliest and Latest Allowable times also provides useful information for conflict resolution. For example, given an RTA at the runway threshold, the pilot and air-traffic controller may need to know the range of times that can be met at an intermediate metering point to achieve traffic spacing objectives, while still meeting the original RTA at the threshold.

In current RTA implementations, the RTA is predicted to be made (RTA Achievable) or not (RTA Unachievable) based solely on the current ETA at the RTA point. However, there is no indication of the uncertainty associated with the generation of this time-of-arrival, if this RTA is to be established as a "contract" between the aircraft and the controller, there should be a degree of certainty associated with the indication of the whether or not the RTA can be achieved. There are several ways this ETU may be used to associate a certainty level with the RTA calculation.

The first method of quantifying the uncertainty for an RTA prediction uses the ETU accumulated for the entire flight profile between the aircraft and the RTA point, as defined in equation (19) if a 95% probability is desired or equation (18) in the more general case where only the variance is needed. The required ETU may then be expressed as a percentage of flight time remaining. This is useful for quantifying the uncertainty of a given time prediction. However, it does not take into account the speed control that may be used when controlling to a Required Time-of-Arrival.

Thus, another useful method of quantifying the uncertainty is to use only the uncertainty accumulated between the speed control authority end point and the RTA waypoint. In this case the certainty of the RTA being met depends only on the uncertainty associated with the time prediction between the point at which the speed control ends and the RTA waypoint.

The point at which the speed control ends may be a specified time prior to reaching the RTA, or a point where the speed is limited. In some known RTA Control implementations, the speed adjustment is inhibited a pre-determined amount of time prior to the RTA. However, a situation also exists where the speed may be limited more than the pre-determined amount of time prior to the RTA. An example of this situation is when the RTA waypoint is the runway threshold. In this case, the maximum speed is typically limited by airport and procedural speed restrictions well before the pre-defined time prior to the RTA.

The point where speed control is lost may be computed in each direction (speed up and slow down) using the minimum and maximum speed profiles backwards from the RTA waypoint. The loss of speed control may occur at different points in the speed up (early) and slow down (late) directions. Computing the uncertainty with the reference time only from the point that the control authority ends provides feedback to the pilot (and potentially controller) associated with the confidence that the RTA can actually be achieved. By computing the ETU as described above, but only between the point where loss of control authority occurs and the RTA waypoint, the RTA can be achieved with 95% probability as long as the RTA is predicted to be met exactly when the control end point is reached, and:

$$ETU_{2\sigma}(\text{Control\_End\_Pt, RTA\_Wpt}) < \text{RTA\_Tol} \tag{26}$$

Figure 7:
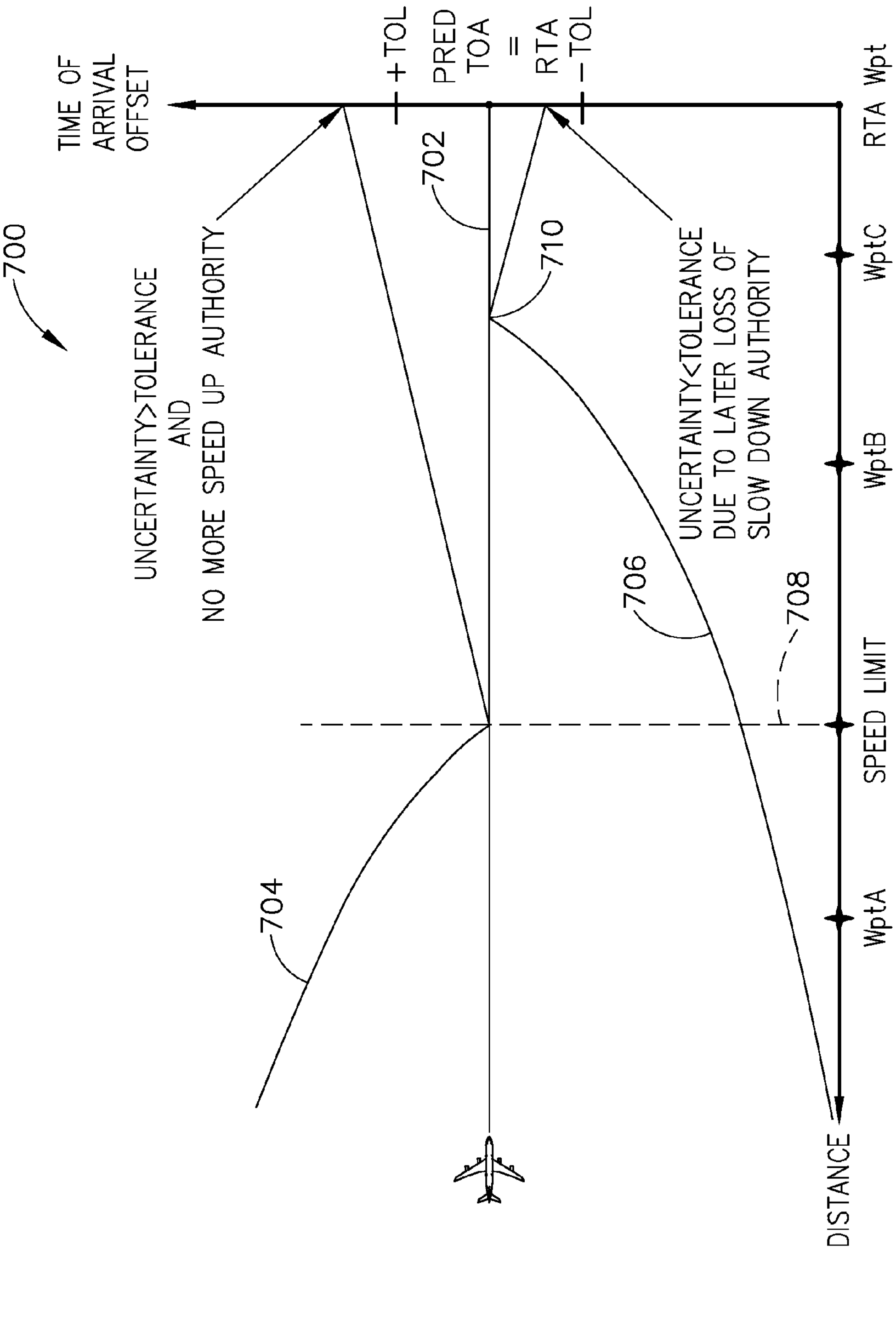

FIG. 7 is a graph 700 illustrating when speed up control ends at a speed limit altitude prior to a loss of slow down control. The ETU may be computed independently in the early and late directions. In the exemplary embodiment, graph 700 includes a time profile trace 702 that results in a zero RTA error, a backwards early profile trace 704 and backwards late profile trace 706. Only the backwards profiles are shown in FIG. 7 because the intersection with the forward profiles is not needed to determine the loss of control authority.

As shown in FIG. 7, the ETU in the late direction exceeds the RTA tolerance, due to the loss of speed up control authority at the speed limit altitude 708. Thus, beyond this point the aircraft has lost the authority to speed up to compensate for uncertainties in the time computation, such as un-modeled headwind, resulting in less than a 95% probability that the aircraft will arrive at the RTA waypoint in the time frame [RTA, RTA+tolerance]. In other words, there is a greater than 5% probability of a LATE RTA error.

However, the loss of control authority in the "slow-down" direction occurs later at 710, resulting in a longer period of authority to slow down to compensate for uncertainties in the time computation, such an stronger than modeled tailwinds. Thus, there is a greater than 95% probability that there will not be an EARLY RTA error. The ETU in the early and late directions may both be computed if needed for a given application. However, if a symmetric display of ETU is needed (with the ETU magnitude equal in both the early and late directions), the larger of the two ETUs should be displayed.

Figure 8:
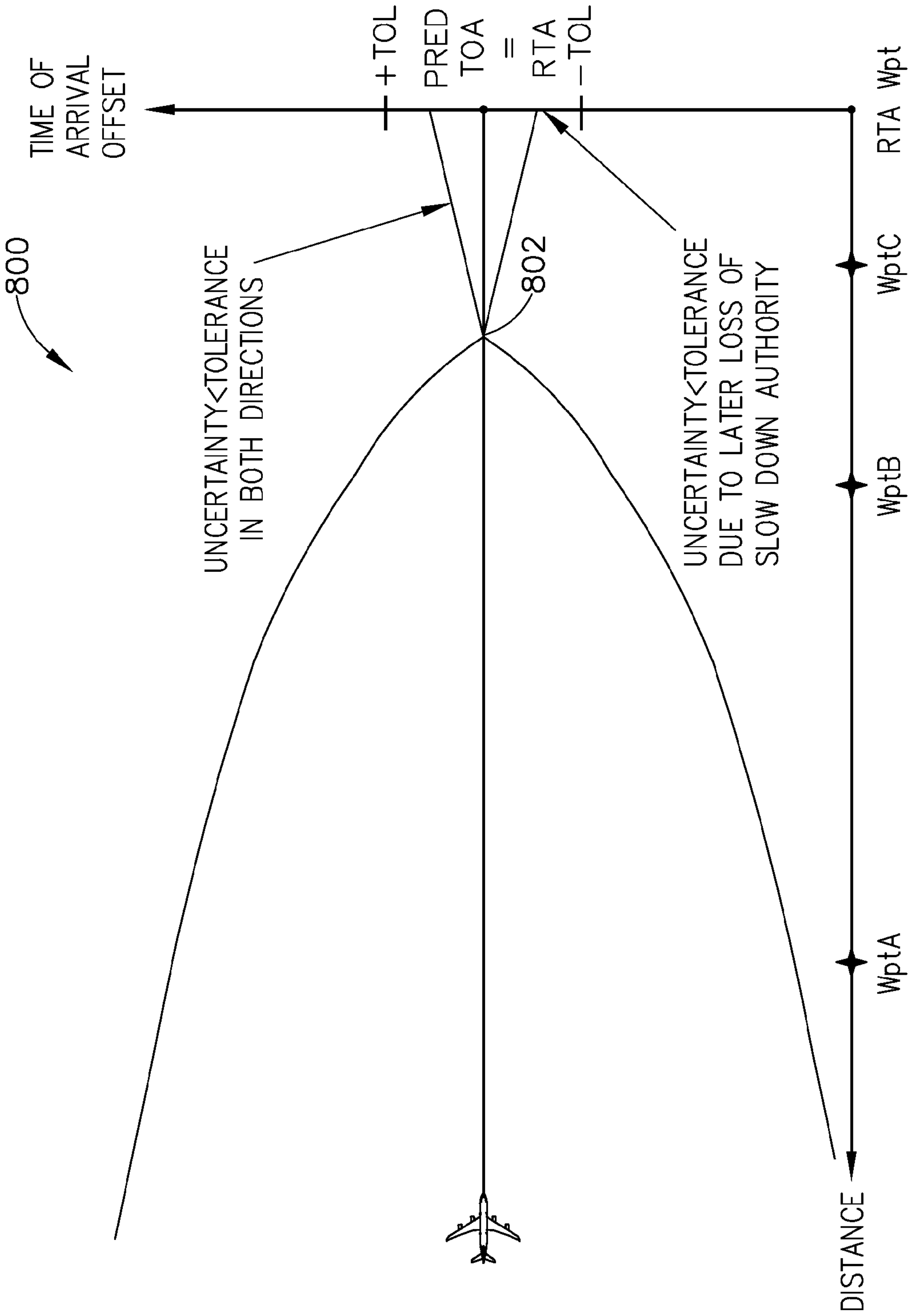

FIG. 8 is graph 800 illustrating an RTA Achievable with 95% probability in accordance with an exemplary embodiment of the present invention. The exemplary embodiment illustrates a case where either the speed limit does not exist or the reference speed profile is not limited by the speed limit, resulting in a later loss of control authority. In this situation, the speed up and slow down control authority ends at the same point 802, resulting in the early and late ETU being approximately equal. Due to the later loss of speed control authority, the RTA can be achieved with 95% probability.

Figure 9:
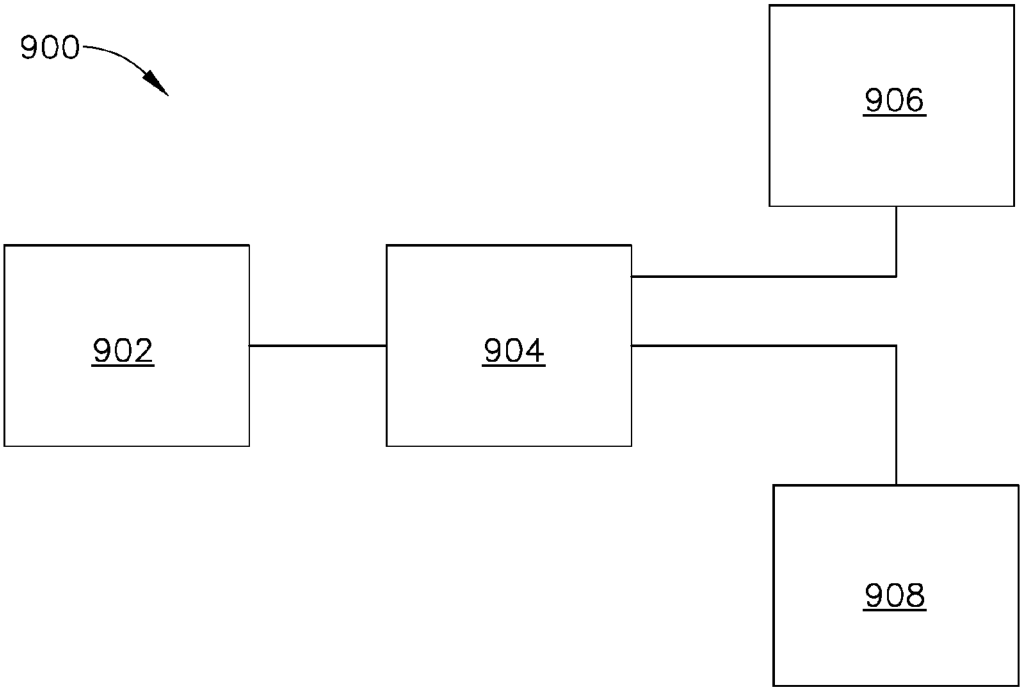

FIG. 9 is a schematic block diagram of a vehicle control system 900. In the exemplary embodiment, vehicle control system 900 includes an input device 902 configured to receive a required time of arrival at a waypoint and a processor 904 communicatively coupled to the input device. Processor 904 is programmed to determine a forward late time profile wherein the forward late time profile represents the latest time the vehicle could arrive at a point along the track while transiting at a minimum available speed, a forward early time profile that represents the earliest time the vehicle could arrive at a point along the track and still arrive at the waypoint while transiting at a maximum available speed. Processor 904 is further programmed to determine an estimated time uncertainty (ETU) associated with at least one of the forward late time profile, forward early time profile and a reference time profile.

Vehicle control system 900 also includes an output device 906 communicatively coupled to processor 904. Output device 906 is configured to transmit the determined uncertainty with a respective one of the at least one of the forward late time profile, forward early time profile and the reference time profile to at least one of another system for further processing. Vehicle control system 900 also includes a display device 908 configured to graphically display the determined uncertainty to a user either locally or to a remote location such as an air-traffic control center.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 904, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for quantification of a level of probability of achieving a computed time-of-arrival that gives both the aircrew and the air traffic controller a quantifiable level of certainty associated with a predicted ETA. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of methods and a system of quantification of a level of probability of achieving a computed time-of-arrival is a cost-effective and reliable means for providing both the aircrew and the air traffic controller a quantifiable level of certainty associated with a predicted ETA. More specifically, the methods and system described herein a rigorous method to determine the uncertainty associated with time-of-arrival calculations, and a method to use this calculation in controlling the aircraft to the required time of arrival. Moreover, the allowable time of arrival uncertainty bounds for intermediate points (between the aircraft and the RTA waypoint) is also useful information to be coordinated between the aircrew and controller. In addition, the above-described methods and system provide economic benefits if each aircraft can determine its desired landing time using its most fuel optimum flight profile. As a result, the methods and system described herein facilitate automatically controlling the speed of a vehicle for arrival at a predetermined waypoint at a selected time in a cost-effective and reliable manner.

Exemplary methods and system for automatically and continuously providing accurate time-of-arrival control at a waypoint for which there is a period of limited speed control authority available are described above in detail. The apparatus illustrated is not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

What is claimed is:

1. A vehicle control system comprising:

an input device configured to receive a required time of arrival at a waypoint;

a processor communicatively coupled to said input device, said processor programmed to:

determine a forward late time profile representing the latest time the vehicle could arrive at a point along the track while transiting at a minimum available speed;

determine a forward early time profile representing the earliest time the vehicle could arrive at a point along the track and still arrive at the waypoint while transiting at a maximum available speed;

determine at least one of an acceleration and a deceleration between the minimum available speed and the maximum available speed;

determine an estimated time uncertainty (ETU) associated with at least one of the forward late time profile, forward early time profile and a reference time profile; and an output device communicatively coupled to the processor, said output device configured to transmit the determined uncertainty with a respective one of the at least one of the forward late time profile, forward early time profile and the reference time profile to at least one of another system for further processing and a display.

2. A system in accordance with claim 1 wherein said processor is further programmed to graphically display at least one of the forward late time profile and the forward early time profile with the respective determined uncertainty.

3. A system in accordance with claim 1 wherein said processor is further programmed to:

determine a backward early time profile using a maximum speed profile backward from the RTA time wherein the maximum speed profile is determined for the vehicle while transiting at a maximum available speed;

determine a backward late time profile using a minimum speed profile backward from the RTA time, wherein the minimum speed profile is determined for the vehicle while transiting at a minimum available speed;

determine an estimated time uncertainty (ETU) associated with at least one of the backward early time profile and the backward late time profile; and output the determined uncertainty with a respective one of the at least one of the backward early time profile and the backward late time profile.

4. A system in accordance with claim 1 wherein said processor is further programmed to graphically display at least one of the backward early time profile and the backward late time profile with the respective determined uncertainty.

5. A system in accordance with claim 1 wherein said processor is further programmed to:

determine the ETU at least one point between an earliest achievable time profiles and a latest achievable time profile; and transmit the determined ETU to at least one of another system for further processing and a display.

6. A system in accordance with claim 1 wherein the track comprises a plurality of segments and wherein said processor is further programmed to:

determine an estimated time uncertainty (ETU) for each of the plurality of segments; and combine the determined estimated time uncertainty (ETU) for the plurality of segments.

7. A system in accordance with claim 1 wherein said processor is further programmed to determine an estimated time uncertainty (ETU) attributable to at least one of an uncertainty associated with a forecast headwind or tailwind, an uncertainty associated with a forecast temperature, an uncertainty associated with a Mach value, an uncertainty associated with an uncertainty in a actual distance flown, an uncertainty associated with the method of integrating the equations of motion, an uncertainty associated with an estimated position along the track, and an uncertainty associated with the input time.

8. A method of controlling a speed of a vehicle along a track, said method comprising:

receiving a required time of arrival (RTA) at a predetermined waypoint;

determining a forward late time profile representing the latest time the vehicle could arrive at a point along the track and still arrive at the predetermine waypoint at the RTA while transiting at a minimum available speed;

determining a forward early time profile representing the earliest time the vehicle could arrive at a point along the track and still arrive at the predetermine waypoint at the RTA while transiting at a maximum available speed;

determining at least one of an acceleration and a deceleration between the minimum available speed and the maximum available speed;

determining an estimated time uncertainty (ETU) associated with at least one of the forward late time profile and the forward early time profile; and outputting the determined uncertainty with a respective one of the at least one of the forward late time profile and the forward early time profile.

9. A method in accordance with claim 7 further comprising graphically displaying at least one of the forward late time profile and the forward early time profile with the respective determined uncertainty.

10. A method in accordance with claim 7 further comprising:

determining a backward early time profile using a maximum speed profile backward from the RTA time wherein the maximum speed profile is determined for the vehicle while transiting at a maximum available speed;

determining a backward late time profile using a minimum speed profile backward from the RTA time, wherein the minimum speed profile is determined for the vehicle while transiting at a minimum available speed;

determining an estimated time uncertainty (ETU) associated with at least one of the backward early time profile and the backward late time profile; and outputting the determined uncertainty with a respective one of the at least one of the backward early time profile and the backward late time profile.

11. A method in accordance with claim 9 further comprising graphically displaying at least one of the backward early time profile and the backward late time profile with the respective determined uncertainty.

12. A method in accordance with claim 7 wherein the track comprises a plurality of segments and wherein determining an estimated time uncertainty (ETU) comprises determining an estimated time uncertainty (ETU) for each of the plurality of segments; and combining the determined estimated time uncertainty (ETU) for the plurality of segments.

13. A method in accordance with claim 7 wherein determining an estimated time uncertainty (ETU) comprises determining an estimated time uncertainty (ETU) attributable to at least one of an uncertainty associated with a forecast headwind or tailwind, an uncertainty associated with a forecast temperature, an uncertainty associated with a Mach value, an uncertainty associated with an uncertainty in a actual distance flown, an uncertainty associated with the method of integrating the equations of motion, an uncertainty associated with an estimated position along the track, and an uncertainty associated with the input time.

14. A method in accordance with claim 12 wherein determining an uncertainty associated with a Mach value comprises determining at least one of an uncertainty associated with a computed Mach value and an uncertainty associated with a measured Mach value.

15. A method of controlling a speed of a vehicle, said method comprising:

receiving a required time of arrival of the vehicle at a waypoint;

determining a forward late time profile representing the latest time the vehicle could arrive at a point along the track and still arrive at the predetermined waypoint while transiting at a maximum available speed;

determining a forward early time profile representing the earliest time the vehicle could arrive at a point along the track and still arrive at the predetermined waypoint while transiting at a minimum available speed;

determining a backward early time profile using a maximum speed profile backward from the RTA time wherein the maximum speed profile is determined for the vehicle while transiting at a maximum available speed;

determining a backward late time profile using a minimum speed profile backward from the RTA time, wherein the minimum speed profile is determined for the vehicle while transiting at a minimum available speed;

determining at least one of an acceleration and a deceleration between the minimum available speed and the maximum available speed;

determining an estimated time uncertainty (ETU) associated with at least one of the forward late time profile, the forward early time profile, the backward early time profile and the backward late time profile; and controlling a speed of the vehicle using at least one of the forward late time profile, the forward early time profile, the backward early time profile the backward late time profile, and a respective determined uncertainty.

16. A method in accordance with claim 15 further comprising graphically displaying at least one of the forward late time profile, the forward early time profile, the backward early time profile the backward late time profile, and a respective determined uncertainty.

17. A method in accordance with claim 15 further comprising:

determining an earliest allowable time and a latest allowable time; and controlling a speed of the vehicle using the earliest allowable time and the latest allowable time.

18. A method in accordance with claim 17 further comprising scaling the earliest allowable time and a latest allowable time using a scaling factor.

19. A method in accordance with claim 18 further comprising determining the scaling factor using the ETU.

20. A method in accordance with claim 18 further comprising receiving the scaling factor from a user.

* * * * *

UNITED STATES PATENT AND TRADEMARK OFFICE

CERTIFICATE OF CORRECTION

PATENT NO. : 8,150,588 B2
APPLICATION NO. : 12/277868
DATED : April 3, 2012
INVENTOR(S) : Klooster It is certified that error appears in the above-identified patent and that said Letters Patent is hereby corrected as shown below:

In Column 9, Line 64, in Equation (17), delete "(A,B,)" and insert -- (A,B) --, therefor.

In Column 15, Line 55, in Claim 9, delete "claim 7" and insert -- claim 8 --, therefor.

In Column 15, Line 59, in Claim 10, delete "claim 7" and insert -- claim 8 --, therefor.

In Column 16, Line 9, in Claim 11, delete "claim 9" and insert -- claim 10 --, therefor.

In Column 16, Line 14, in Claim 12, delete "claim 7" and insert -- claim 8 --, therefor.

In Column 16, Line 20, in Claim 13, delete "claim 7" and insert -- claim 8 --, therefor.

In Column 16, Line 31, in Claim 14, delete "claim 12" and insert. -- claim 13 --, therefor.

Signed and Sealed this
Nineteenth Day of March, 2013

Teresa Stanek Rea
*Acting Director of the United States Patent and Trademark Office*